(12) United States Patent
Miyabe (10) Patent No.: US 9,100,117 B2
(45) Date of Patent: Aug. 4, 2015

(54) APPARATUS AND METHOD FOR SWITCHING A COMMUNICATION PATH

(71) Applicant: FUJITSU LIMITED, Kawasaki-shi, Kanagawa (JP)

(72) Inventor: Masatake Miyabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 98 days.

(21) Appl. No.: 14/030,128

(22) Filed: Sep. 18, 2013

(65) Prior Publication Data

US 2014/0161437 A1 Jun. 12, 2014

(30) Foreign Application Priority Data

Dec. 11, 2012 (JP) ................................. 2012-270738

(51) Int. Cl.
*H04B 10/032* (2013.01)
*H04L 12/26* (2006.01)
*H04L 12/56* (2006.01)

(52) U.S. Cl.
CPC .................................... *H04B 10/032* (2013.01)

(58) Field of Classification Search
CPC ......... H04L 45/12; H04L 45/48; H04L 45/28; H04L 45/18
USPC ..................................................... 398/1, 4, 5
See application file for complete search history.

(56) References Cited

U.S. PATENT DOCUMENTS

| 6,915,463 | B2 * | 7/2005 | Vieregge et al. | 714/704 |
|---|---|---|---|---|
| 2009/0226164 | A1 * | 9/2009 | Mayo et al. | 398/25 |
| 2010/0157813 | A1 | 6/2010 | Matsuura | |
| 2011/0305136 | A1 * | 12/2011 | Pan et al. | 370/218 |

FOREIGN PATENT DOCUMENTS

JP 2010-147932 7/2010

OTHER PUBLICATIONS

J.P. Lang et al., "RSVP-TE Extensions in Support of End-to-End Generalized Multi-Protocol Label Switching (GMPLS) Recovery", pp. 1-47, May 2007.
D. Awduche et al., "RSVP-TE: Extensions to RSVP for LSP Tunnels", pp. 1-61, Dec. 2001.

* cited by examiner

*Primary Examiner* — Oommen Jacob
(74) *Attorney, Agent, or Firm* — Staas & Halsey LLP (57) ABSTRACT

An apparatus serves as a node in a network on which plural working paths and plural protection paths for bypassing the plural working paths are set, where the plural protection paths share bandwidths allocated thereto. The apparatus includes a data plane unit functioning as an interface that transmits and receives data with a node in the network. The apparatus predicts a first working path having a highest probability that a failure is likely to occur, among the plural working paths, based on transmission qualities of the plural working paths. The apparatus beforehand sets, to the data plane unit, a setting value for a first protection path corresponding to the first working path, and validates the setting value set to the data plane unit, based on a request for activating the first protection path, when the first working path is switched to the first protection path.

6 Claims, 7 Drawing Sheets

TRANSMISSION QUALITY INFORMATION

FIG. 6

TRANSMISSION QUALITY INFORMATION
OF CORRESPONDING WORKING PATH

APPARATUS AND METHOD FOR SWITCHING A COMMUNICATION PATH

CROSS-REFERENCE TO RELATED APPLICATION

This application is based upon and claims the benefit of priority of the prior Japanese Patent Application No. 2012-270738, filed on Dec. 11, 2012, the entire contents of which are incorporated herein by reference.

FIELD

The embodiment discussed herein is related to apparatus and method for switching a communication path.

BACKGROUND

In recent years, a transmission apparatus for an Optical Transport Network (OTN) or the like has been provided as a transmission apparatus (hereinafter, which may also be referred to as a node) designed for communication common carriers. Communication common carriers are requested to construct a network in which plural redundant paths (hereinafter, which may also be referred to as routes) are prepared to ensure a service availability so that even when one of the paths fails to operate and causes a communication inability, the service may continuously be provided by using another path. In addition, communication common carriers are requested to construct a network composed of a fewer facilities than ever so as to hold down prices for the provided service.

As a scheme for constructing the network responding to these requests, a shared mesh restoration scheme is proposed, for example. The shared mesh restoration scheme is a scheme where protection paths share a bandwidth, and resources for a recovery from the failure may be reduced, so that the high service availability may be realized at low costs.

Figure 8:
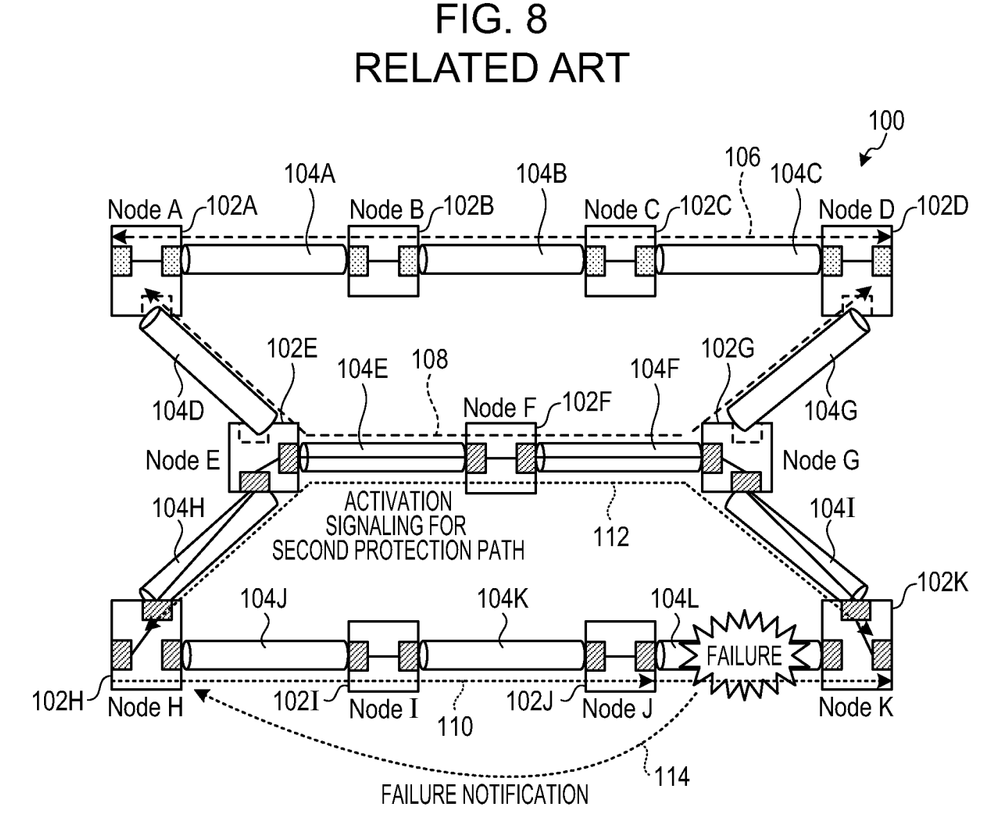
FIG. 8 is a diagram illustrating an example of a network when a failure has occurred.

As illustrated in FIG. 8, for example, 11 nodes including nodes 102A to 102K are coupled to each other via 12 links including links 104A to 104L on a network 100 based on the shared mesh restoration.

The network 100 sets a path passing through the nodes 102A, 102B, 102C, and 102D as a first working path and sets a path passing through the nodes 102H, 102I, 102J, and 102K as a second working path. The network 100 also sets a path passing through the nodes 102A, 102E, 102F, 102G, and 102D as a first protection path and sets a path passing through the nodes 102H, 102E, 102F, 102G, and 102K as a second protection path. The path passing through the nodes 102E, 102F, and 102G is a path shared by the first protection path and the second protection path.

According to the example of FIG. 8, communications on the first working path, the first protection path, the second working path, and the second protection path are respectively controlled by signaling messages 106, 108, 110, and 112. The respective nodes mutually transmit messages giving instruction information on securing the bandwidth or the like of the paths.

The respective nodes on the first working path and the second working path acquire the bandwidths requested by the corresponding signaling messages 106 and 110. The respective nodes on each of the paths perform setting of a data plane unit and activation of the path. The setting of the data plane unit includes setting of a line interface unit functioning as an input and output interface and setting of a cross connect unit that connects the respective line interface units. This allows user traffics to flow on the first and second working paths.

Since the first working path and the second working path pass through mutually different nodes and links on the network 100, the first working path and the second working path are not affected by the same link failure or the same node failure at the same time. In the case, bandwidths requested by the signaling messages 108 and 112 are reserved for the nodes on the first protection path and the second protection path, respectively.

Meanwhile, since a path passing through the nodes 102E, 102F, and 102G is shared by the first protection path and the second protection path, the bandwidth thereof is reserved. However, the setting of the data plane unit is not conducted at the nodes 102E, 102F, and 102G. This is because whether the shared nodes and links are utilized by the first protection path or the second protection path is not determined at a time before the occurrence of failure.

Here, it is assumed that a failure has occurred, for example, at the link 104L located between the node 102J and the node 102K on the network 100. For example, when an error is detected on the input and output interface connected to the link 104L, the node 102J determines that the failure has occurred at the link 104L and notifies the node 102H of failure information 114. When the failure information 114 is received, the node 102H switches the communication on the second working path to the communication on the second protection path. It is noted that the bandwidth has already been reserved on the second protection path, but the setting of the data plane unit has not yet been conducted.

The node 102H transmits the signaling message 112 for activating the second protection path so as to perform the setting of the data plane unit corresponding to the second protection path. When the nodes 102E, 102F, 102G, and 102K on the second protection path receive the signaling message 112, the data plane unit is set and validated at each of the nodes 102E, 102F, 102G, and 102K so that the reserved bandwidth may be utilized as the second protection path. The data plane unit is similarly set and validated at the node 102H. When the setting of the data plane units at the respective nodes on the second protection path is validated and the second protection path is activated, the user traffic starts to flow on the second protection path, and the service is recovered.

See Japanese Laid-open Patent Publication No. 2010-147932.

See also IETF RFC 4872, May 2007 and IETF RFC 3209, December 2001.

SUMMARY

According to an aspect of the invention, an apparatus serves as a node in a communication network on which a plurality of working paths and a plurality of protection paths for bypassing the plurality of working paths are set, where the plurality of protection paths share bandwidths allocated to the plurality of protection paths. The apparatus includes a data plane unit, a failure prediction unit, a node setting unit, and a processing unit. The data plane unit functions as an interface that transmits and receives data with another apparatus serving as a node in the communication network. The failure prediction unit predicts a first working path having a highest probability that a failure is likely to occur, among the plurality of working paths, based on transmission qualities of the plurality of working paths corresponding to the plurality of protection paths. The node setting unit beforehand sets, to the data plane unit, a setting value for a first protection path corresponding to the first working path. The processing unit validates the setting value set to the data plane unit, based on a request of activation processing for activating the first protection path corresponding to the first working path, when the first working path is switched to the first protection path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

According to the shared mesh restoration, the signaling for activating the protection path is conducted after the failure has occurred, and the activation is conducted after the setting of the data plane unit has been carried out at the respective nodes on the protection path. As a result, if the setting of the data plane unit at the respective nodes is not complete, the activation of the protection path is not complete, and it takes time to switch to the protection path after the signaling has been conducted.

Hereinafter, embodiments of a transmission apparatus, a transmission method, and a transmission program disclosed in the present application will be described in detail on the basis of the drawings. The disclosed technology is not limited by the embodiments. According to the following embodiments, a network where respective nodes are connected to each other by an optical transport network will be described.

Embodiments

Figure 1:
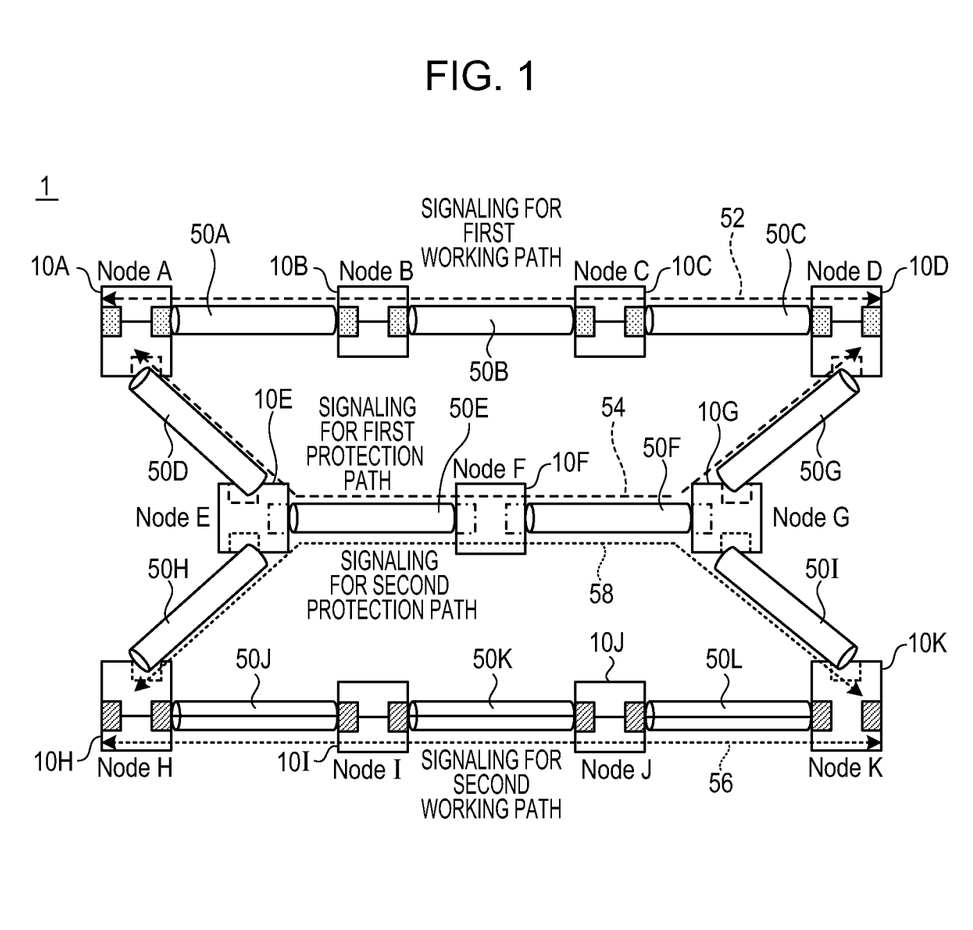
FIG. 1 is a diagram illustrating an example of a network, according to an embodiment.

A network 1 illustrated in FIG. 1 includes plural nodes 10. Among the nodes 10, nodes 10A to 10K are connected to each other via links 50A to 50L composed of optical fibers. The network 1 sets a path passing through the nodes 10A, 10B, 10C, and 10D as a first working path and sets a path passing through the nodes 10H, 10I, 10J, and 10K as a second working path. The network 1 also sets a path passing through the nodes 10A, 10E, 10F, 10G, and 10D as a first protection path and sets a path passing through the nodes 10H, 10E, 10F, 10G, and 10K as a second protection path. Data transmission is bi-directionally conducted, for example, on the respective paths.

The path setting with respect to the respective nodes on the first working path, the second working path, the first protection path, and the second protection path is conducted by using signaling messages. For example, when the node 10A is set as the start node of the first working path, the node 10A transmits a signaling message 52 to each of the nodes on the first working path. Each of the nodes on the first working path receives the signaling message 52 and performs the setting of the working path. With regard to the first protection path, the second working path, and the second protection path, similarly, the respective nodes receive signaling messages 54, 56, and 58 and perform the corresponding path setting.

Figure 2:
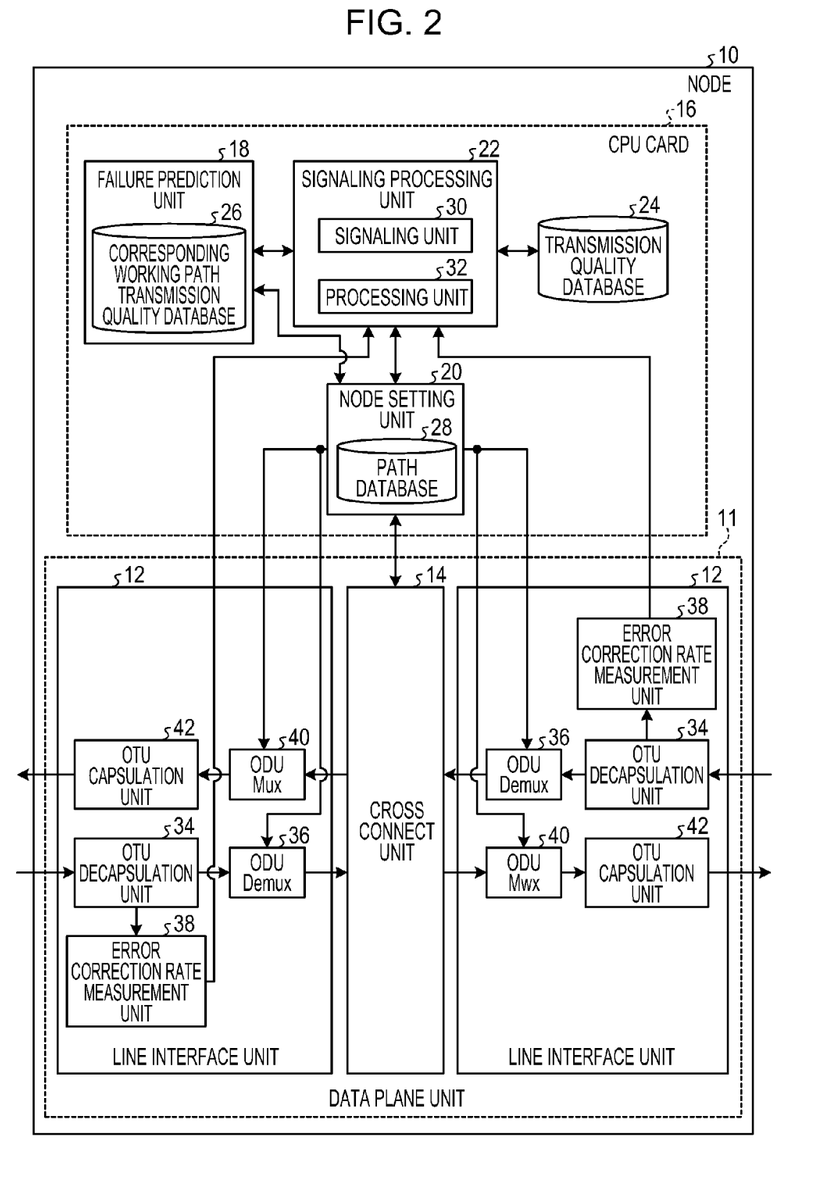
FIG. 2 is a diagram illustrating an example of a configuration of each of nodes, according to an embodiment.

FIG. 2 is a diagram illustrating an example of a configuration of each of nodes, according to an embodiment. The node 10 illustrated in FIG. 2 includes a data plane unit 11 and a central processing unit (CPU) card 16.

The data plane unit 11 includes two line interface units 12 and a cross connect unit 14. The line interface units 12 are connected to other nodes via a link composed of an optical fiber and are configured to transport the user traffic. For convenience of description, a case in which the two line interface units 12 are prepared at each of the nodes is described, for example, but the number of the line interface units 12 may appropriately be changed in accordance with the number of branching or converging paths, and three or more line interface units 12 may be prepared.

A line interface unit 12 includes an optical transport unit (OTU) decapsulation unit 34, an optical data unit (ODU) demultiplexer unit 36, an error correction rate measurement unit 38, an ODU multiplexer unit 40, and the OTU capsulation unit 42. The line interface unit 12 is set in accordance with a line interface setting, where the line interface setting includes settings of the path route information, the bandwidth information, the allocated time slot information, and the like of the line interface unit 12.

The OTU decapsulation unit 34 decapsulates an OTU frame received from another node via the link to extract an ODU frame. The OTU decapsulation unit 34 also outputs error correction data, based on an error correction result of the OTU frame.

The ODU demultiplexer unit (ODU Demux) 36 extracts an OPU frame from the ODU frame that has been extracted by the OTU decapsulation unit 34.

The error correction rate measurement unit 38 measures an error correction rate of the transmission path, based on the error correction data output from the OTU decapsulation unit 34. The error correction rate measurement unit 38 also notifies a signaling unit 30 of transmission quality data where the error correction rate is set as the transmission quality. The error correction rate measurement unit 38 is provided for nodes on the working path, and the error correction rate measurement unit 38 may be omitted for nodes on the protection path.

The ODU multiplexer unit 40 generates the ODU frame from the OPU frame output from the cross connect unit 14.

The OTU capsulation unit 42 capsulates the ODU frame generated in the ODU multiplexer unit 40 and generates the OTU frame to be output to the link.

The cross connect unit 14 outputs, in accordance with a cross connection setting, the OPU frames extracted in the respective line interface units 12 to the corresponding line interface unit 12 in which a path to the target node is set. The cross connection setting defines to which line interface unit 12 the OPU frame is to be output.

The CPU card 16 includes a failure prediction unit 18, a node setting unit 20, a signaling processing unit 22, and a transmission quality database 24. For example, as a specific hardware configuration, the CPU card 16 includes a CPU, a memory, such as a random access memory (RAM) and a read only memory (ROM), and a storage, such as a solid state drive (SSD) and a hard disk drive (HDD).

The failure prediction unit 18 includes a transmission quality database 26 for the corresponding working path (hereinafter, simply referred to as database 26). In a case where a protection path is set to the node 10, the database 26 stores transmission quality data of the corresponding working path. In a case where plural protection paths are set to the node 10, the database 26 stores respective transmission quality data of the corresponding working paths. The transmission quality data of the corresponding working path stored in the database 26 is input, by the signaling message for the protection path, via the signaling processing unit 22 which will be described below. The transmission quality data of the corresponding working path may be stored in the database 26, in advance, by another unit or in other ways.

The failure prediction unit 18 refers to a path database 28 in the node setting unit 20 which will be described below, and identifies plural protection paths that share the same time slot (resource). Subsequently, the failure prediction unit 18 takes out transmission quality data of the plural working paths corresponding to the identified plural protection paths from the database 26. The failure prediction unit 18 compares the taken-out transmission qualities of the plural working paths with each other. Since the transmission quality of the link and node gradually deteriorates with time, it is possible to predict a failure by comparing the transmission qualities with each other.

The failure prediction unit 18 predicts a working path having the highest probability that a failure is likely to occur, on the basis of the result of the comparison of the transmission qualities, and outputs prediction information. At this time, a bit error rate, a bit correction rate based on an error correction code, a packet discard rate, and an optical signal to noise ratio may be used for a transmission quality, for example.

The failure prediction unit 18 is provided for a node shared by the plural protection paths, and the failure prediction unit 18 may be omitted for the other nodes.

The node setting unit 20 includes the path database 28 and refers to the path database 28 so as to carry out the setting of the data plane unit 11 in advance on the basis of the prediction information output from the failure prediction unit 18. The setting of the data plane unit 11 refers to the line interface setting and the cross connection setting with respect to the line interface units 12 and the cross connect unit 14, including settings of the path route information, the bandwidth information, the allocated time slot information, and the like.

In a case where activation processing for a protection path is requested from a processing unit 32 which will be described below, the node setting unit 20 performs on the data plane unit 11 the activation processing for the protection path. When the activation processing for the protection path is complete, the data plane unit 11 performs switching from the working path to the protection path. Even when the node setting unit 20 performs the setting of the data plane unit 11, a state in which the user traffic starts to flow is not established until the activation processing for the protection path is complete.

The path database 28 stores the line interface setting and the cross connection setting on the working path and the protection path, including the path route information, the bandwidth information, the allocated time slot information, and the like.

The signaling processing unit 22 includes the signaling unit 30 and the processing unit 32. The signaling unit 30 exchanges a signaling message with other nodes by using a control plane, not illustrated in the drawings, that is a line different from the link. For example, Resource Reservation Protocol-Traffic Engineering (RSVP-TE) may be used for the signaling message. The signaling unit 30 may be omitted if another element (for example, the user traffic not flowing for a certain period of time, or the like) is used as a trigger for switching from the working path to the protection path.

In a case where information that requests activation processing for activating a protection path exists in the signaling message received by the signaling unit 30, the processing unit 32 determines whether or not the protection path is the same as a protection path predicted in the prediction information. As a result of the determination, in a case where a protection path for which the activation processing is requested is the same as a protection path predicted in the prediction information, the processing unit 32 instructs the node setting unit 20 to validate the setting value already set in the data plane unit 11. As a result, the protection path is activated in accordance with the validation of the setting value. When a protection path for which the activation processing is requested is different from a protection path predicted in the prediction information, the processing unit 32 sets a new setting value in the data plane unit 11 for the validation.

The transmission quality database 24 is provided for the start node on the working path and stores transmission quality data transmitted by means of the signaling messages from the respective nodes on the working path and transmission quality data measured at the start node. The transmission quality database 24 may be omitted at nodes other than the start node on the working path.

Figure 3:
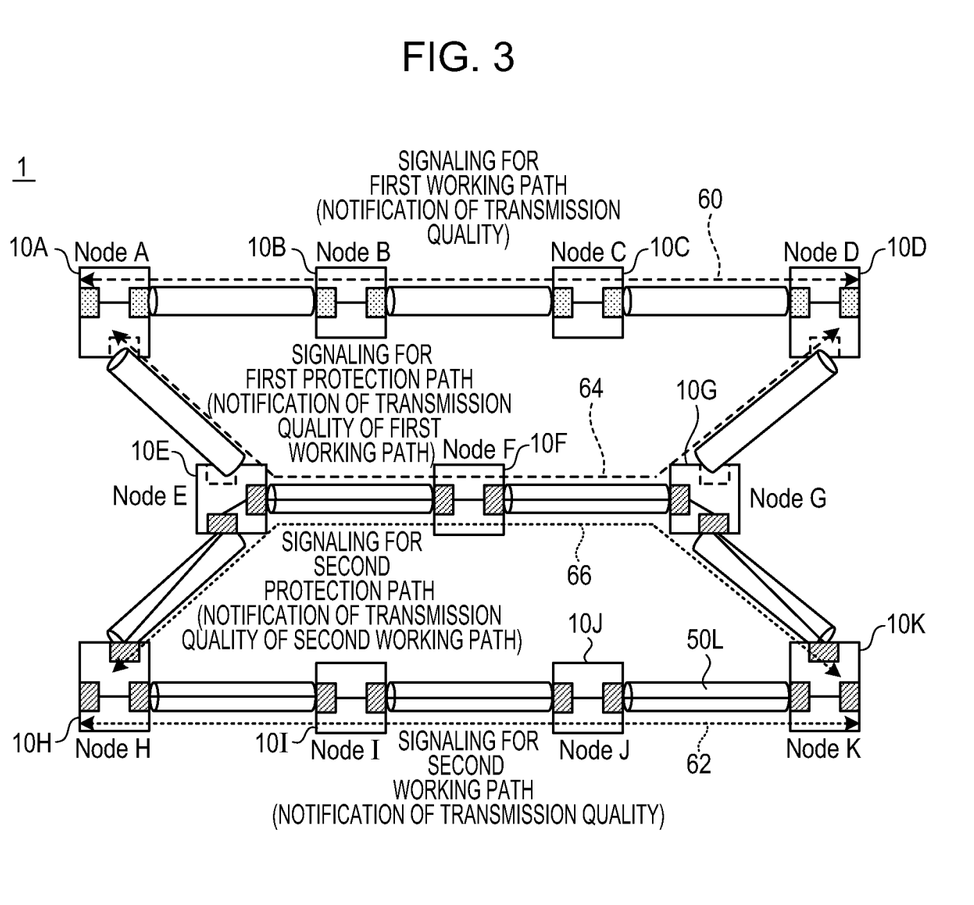
FIG. 3 is a diagram illustrating an example of an operation for predicting a failure on a network, according to an embodiment.
Figure 4:
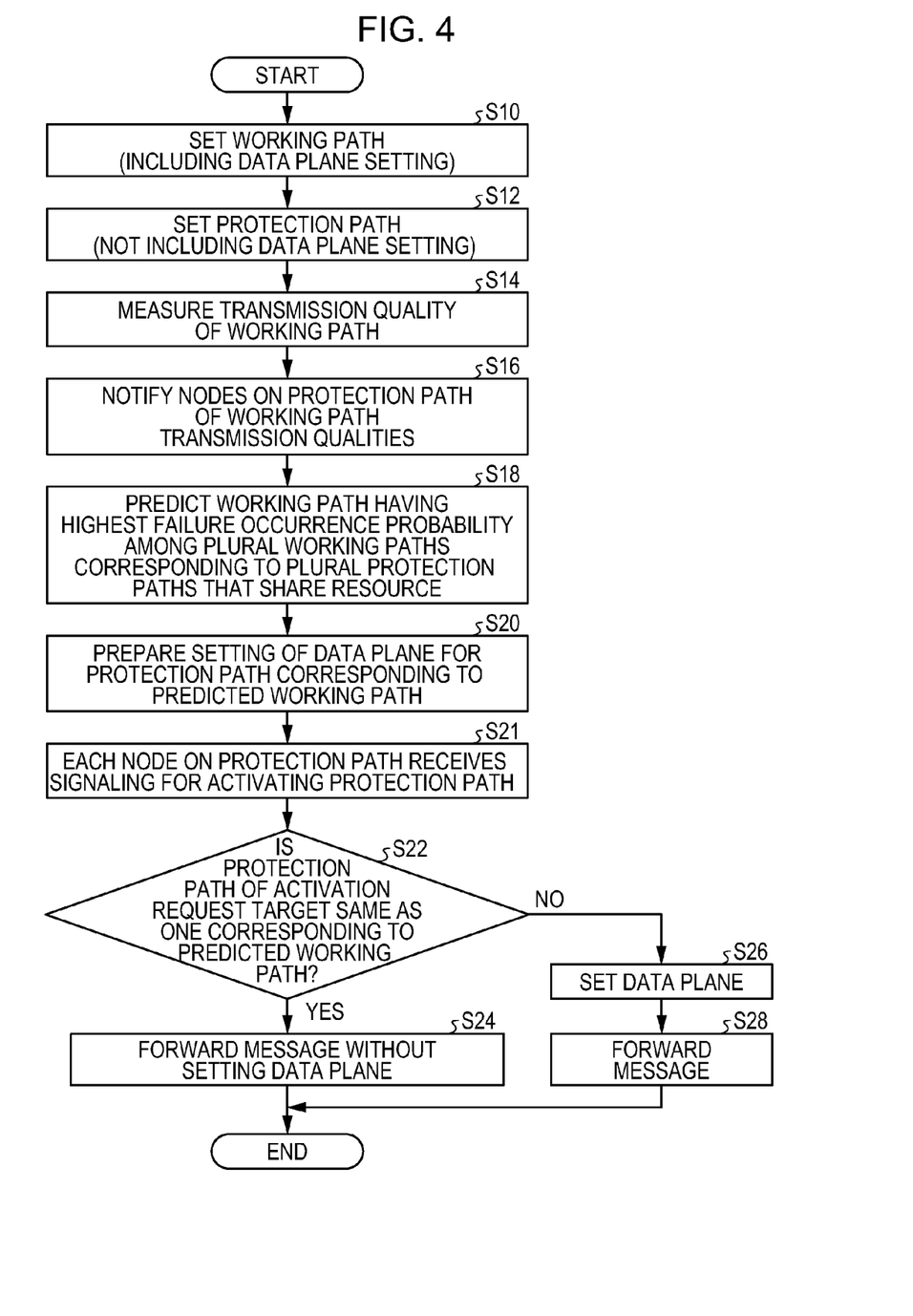
FIG. 4 is a diagram illustrating an example of an operational flowchart for an entire system related to switching to a protection path, according to an embodiment.

Next, an operation of a node according to an embodiment will be described. FIG. 3 is a diagram illustrating an example of an operation for predicting a failure on a network, according to an embodiment, and FIG. 4 is a diagram illustrating an example of an operational flowchart for an entire system related to switching to a protection path, according to an embodiment.

First, each node on the first working path, the second working path, the first protection path, and the second protection path takes out the path route information, the bandwidth information, and the information on the allocated time slot, from the signaling message received from the start node. Each node stores the taken-out information in the path database 28. That is, each node stores, in the path database 28, the setting values for the data plane unit 11.

Further, the node setting unit 20 of each node on the first working path and the second working path performs setting of the data plane unit by referring to the path database 28, to validate the setting value. As a result, the first working path and the second working path are activated to establish a state in which the user traffic may flow (step S10).

Since nodes on the first protection path and the second protection path shares the bandwidth in the sections between the nodes 10E, 10F, and 10G, in other words, the nodes are shared with each other, the nodes do not perform the setting of the data plane unit 11 and only perform reservation of the bandwidth (step S12).

Next, the respective nodes on the first working path measure transmission qualities. For example, it is assumed that the node 10A is set as the start node, the nodes 10B and 10C are set as the relay nodes, and the node 10D is set as the terminating node. When the node 10D is represented as an example, the error correction rate measurement unit 38 at the node 10D measures a transmission path error correction rate as a transmission quality and notifies the signaling unit 30 of the transmission quality data. The signaling unit 30 at the node 10D stores the transmission quality data in a signaling message 60 illustrated in FIG. 5. The node 10D transmits the signaling message 60 towards the start node 10A. At this time, the signaling message 60 is sequentially relayed (forwarded) from the terminating node via the relay nodes towards the start node. Accordingly, the relay nodes 10B and 10C add the transmission quality data thereof to the signaling message 60 and transmit the data towards the upstream nodes (step S14).

Figure 5:
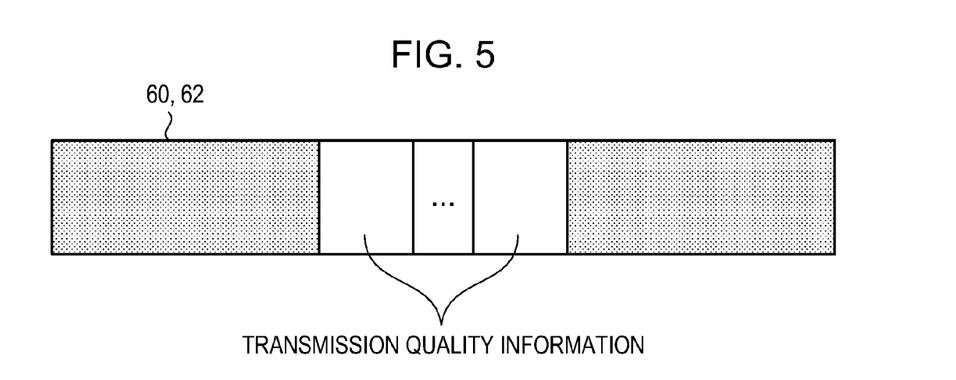
FIG. 5 is a diagram illustrating an example of a signaling message for a working path, according to an embodiment.

Upon receiving the signaling message 60, the start node 10A takes out the transmission quality data of the nodes 10B, 10C, and 10D from the signaling message 60 via the signaling unit 30. The start node 10A also measures the error correction rate and obtains the transmission quality data in a manner similar to the other nodes on the first working path. When the collection of the transmission quality data of all the nodes on the first working path is complete, the start node 10A stores the transmission quality data in the transmission quality database 24.

The respective nodes on the second working path also obtain transmission quality data and store the data in a signaling message 62 in a manner similar to the nodes on the first working path. For example, the node 10H is set as the start node, the nodes 10I and 10J are set as the relay nodes, and the node 10K is set as the terminating node. At this time, the signaling message 62 for the second working path is sequentially relayed (forwarded) from the terminating node via the relay nodes towards the start node. Accordingly, the relay nodes 10I and 10J add the transmission quality data to the signaling message 62 and transmit the data to the upstream nodes.

When the start node 10H receives the signaling message 62, the start node 10H takes out the transmission quality data of the nodes 10I, 10J, and 10K from the signaling message 62 via the signaling unit 30. The start node 10H also measures the error correction rate and obtains the transmission quality data in a manner similar to the other nodes on the second working path. When the collection of the transmission quality data at all the nodes on the second working path is complete, the start node 10H stores the transmission quality data in the transmission quality database 24. These signaling messages 60 and 62 are, for example, RSVP-TE Resv messages.

Figure 6:
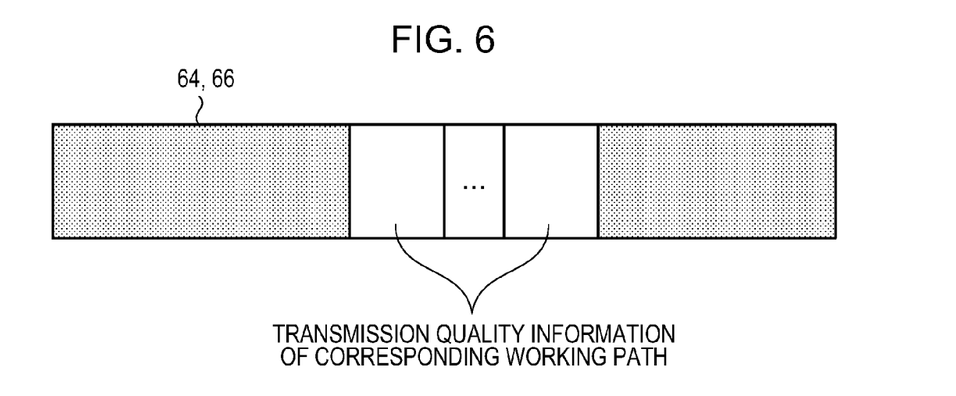
FIG. 6 is a diagram illustrating an example of a signaling message for a protection path, according to an embodiment.

Next, the start node on the first protection path notifies the respective nodes on the first protection path of the transmission quality data of the first working path. At this time, for example, the node 10A is set as the start node, the nodes 10E, 10F, and 10G are set as the relay nodes, and the node 10D is set as the terminating node on the first protection path. The start node 10A on the first protection path stores the transmission quality data of the respective nodes on the first working path in a signaling message 64 as illustrated in FIG. 6, and notifies the relay nodes 10E, 10F, and 10G and the terminating node 10D on the first protection path of the data (step S16).

Upon receiving the signaling message 64, the relay nodes 10E, 10F, and 10G and the terminating node 10D take out the transmission quality data at the respective nodes on the first working path from the signaling message 64, and store the transmission quality data in the database 26. At this time, the signaling message 64 is sequentially relayed (forwarded) from the start node via the relay nodes towards the terminating node. In other words, the relay nodes 10E, 10F, and 10G take out the transmission quality data from the signaling message 64 and transmit the transmission quality data towards the downstream nodes.

The start node on the second protection path also performs the notification to the respective nodes on the second protection path in a manner similar to the first protection path. For example, the node 10H is set as the start node, the nodes 10E, 10F, and 10G are set as the relay nodes, and the node 10K is set as the terminating node on the second protection path. The start node on the second protection path 10H stores the transmission quality data at the respective nodes on the second working path in a signaling message 66 as illustrated in FIG. 6, and notifies the relay nodes 10E, 10F, and 10G and the terminating node 10K on the second protection path of the data.

Upon receiving the signaling message 66, the relay nodes 10E, 10F, and 10G and the terminating node 10K take out the transmission quality data at the respective nodes on the second working path from the signaling message 66 and store the transmission quality data in the database 26. At this time, the signaling message 66 is sequentially relayed (forwarded) from the start node via the relay nodes towards the terminating node. Accordingly, the relay nodes 10E, 10F, and 10G take out the transmission quality data from the signaling message 66 and transmit the data towards the downstream nodes. These signaling messages 64 and 66 are, for example, RSVP-TE Path messages.

In this case, the database 26 at each of the relay nodes 10E, 10F, and 10G stores the transmission quality data at the respective nodes on both the first and second working paths. In other words, a state is established in which the relay nodes 10E, 10F, and 10G are shared by both the first and second protection paths.

Subsequently, the relay nodes 10E, 10F, and 10G identify protection paths that share the same time slot (resource). Herein, it is assumed that the first protection path and the second protection path share the same time slot.

At each of the relay nodes 10E, 10F, and 10G, the failure prediction unit 18 refers to the path database 28 and identifies that the first protection path and the second protection path share the same time slot. The failure prediction units 18 of the relay nodes 10E, 10F, and 10G take out the transmission quality data of a first working path and a second working path that respectively correspond to the first protection path and the second protection path, from the databases 26. The working path having the high probability of the occurrence of failure is selected from among the first and second working paths, based on the transmission quality data of the first and second working paths (step S18).

The working path having the high probability of the occurrence of failure is selected, for example, on the basis of a determination criterion in which a working path having the lowest transmission quality has the highest probability that the failure is likely to occur. Accordingly, the failure prediction unit 18 compares the transmission quality data of the first working path with the transmission quality data of the second working path, and predicts, for example, that the working path having the higher bit correction rate of the OTU frame has a high probability that the failure is likely to occur. Herein, it is assumed that the second working path is predicted as a working path having the high probability that the failure is likely to occur.

The failure prediction units 18 of the relay nodes 10E, 10F, and 10G instruct the respective node setting units 20 to perform on the data plane units 11 the setting of the second protection path corresponding to the predicted second working path.

The node setting units 20 at the relay nodes 10E, 10F, and 10G read out the line interface setting and the cross connection setting from the respective path databases 28 on the basis of the instruction from the failure prediction units 18. Subsequently, the preliminary setting is put in the data plane units 11 (step S20). In this state, since the activation of the second protection path is not carried out, the user traffic does not flow on the second protection path.

Next, switching from the second working path to the second protection path will be described while it is assumed that the failure occurs on the second working path. A failure occurs, for example, at the link 50L on the second working path and the failure is detected by the node 10J. The node 10J transmits a failure notification to the node 10H that is the start node of the second working path. Upon receiving the failure notification, the node 10H also serving as the start node on the second protection path transmits the signaling message for activating the second protection path, that is, the RSVP-TE Path message, to the respective nodes on the second protection path.

When the relay nodes 10E, 10F, and 10G receive the signaling message, the respective signaling units 30 request the processing units 32 to perform the activation processing for the second protection path (step S21). The processing units 32 determine that a second protection path that is the request target for the activation processing is the same as a second protection path indicated by the prediction information (step S22: YES).

Since the request target for the activation processing is the same as that indicated by the prediction information, the processing units 32 validate the preliminarily set value without performing the setting on the data plane unit 11. The relay nodes 10E, 10F, and 10G forward the signaling message to the downstream nodes (step S24).

When the node 10K serving as the terminating node receives the signaling message, the signaling unit 30 requests the processing unit 32 to perform the activation processing. The processing unit 32 instructs the node setting unit 20 to perform the setting of the second protection path on the data plane unit 11, and sets a new setting value in the data plane unit 11. At the node 10H serving as the start node on the second protection path, a new setting value is similarly set in the data plane unit 11. Thus, when the settings of the data plane units 11 of the respective nodes on the second protection path are validated and the second protection path is activated, the path through which the user traffic flows is switched from the second working path to the second protection path.

Here, operations of the relay nodes 10E, 10F, and 10G will be described in a case where a failure occurs on a first working path different from one indicated by the prediction information. When the relay nodes 10E, 10F, and 10G receive the signaling message, the respective signaling units 30 request the processing units 32 to perform the activation processing on the first protection path. The processing units 32 determine that a first protection path that is the request target of the activation processing is different from the second protection path indicated by the prediction information (step S22: NO). The processing units 32 then instruct the node setting units 20 to perform the setting for the first protection path on the data plane unit 11, and set new setting values (step S26). The relay nodes 10E, 10F, and 10G also forward the signaling message to the downstream nodes (step S28).

When the new setting values are set in the data plane units 11 of the respective nodes on the first protection path for the activation and the first protection path is activated as described above, a path through which the user traffic is to flow is switched from the first working path to the first protection path.

The start node 10A and the terminating node 10D on the first protection path perform operations similar to those performed by the start node 10H and the terminating node 10K on the second protection path when a failure occurs on the second working path.

A node 10 according to the embodiment sets, in advance, on the data plane unit 11, a protection path setting value corresponding to the working path for which an occurrence of failure is predicted, with respect to nodes shared by the plural protection paths. As a result, in a case where a failure occurs on the working path as predicted, it is possible to shorten a period of time from the occurrence of the failure on the working path to the completion of the switching to the protection path.

By measuring, as a transmission quality, at least one of a bit error rate, a bit correction rate based on an error correction code, a packet discard rate, and an optical signal to noise ratio, the transmission quality data in accordance with the characteristic of the transmission path is obtained, thereby raising the accuracy of predicting a failure.

Furthermore, since the signaling units are provided for the respective nodes on the protection path, the transmission quality data of the corresponding working path may be updated as desired, thereby allowing the optimal failure prediction.

Although a start node on the working path is the same as a start node on the protection path in the above embodiment, the protection path may branch off from a mid-flow of the working path. In that case, the transmission quality data of the corresponding working path may be notified by the signaling message for the working path up to the branch node, and the transmission quality data may be notified by the signaling message for the protection path from the node at which the protection path branches off, that is, from the start node on the protection path. As a result, even if a protection path branches off from a point other than the start node on the working path, the transmission quality data of the corresponding working path may be updated for the respective nodes on the protection path via the signaling message, thereby allowing the optimal failure prediction.

According to the above-mentioned embodiment, it is assumed that the number of plural protection paths sharing a node is two. However, the number of protection paths is not limited to this, and more protection paths may also share the node. Furthermore, the network configuration is also not limited to the embodiment, and any network configuration may be adopted as long as an alternative path is secured. In addition, the embodiment may also be adopted not only to a network employing the shared mesh restoration scheme but also to any network as long as a protection path is shared by plural working paths.

In addition, the respective components of the respective units illustrated in the drawings may not be configured physically as illustrated. That is, a configuration of disintegration or integration of the respective units is not limited to the illustrated example, and all or a part of the respective units may be configured through disintegration or integration mechanically or physically in an arbitrary unit in accordance with various loads, usage states, and the like.

Furthermore, all or a part of the various processing functions carried out in the respective apparatuses may be executed on a CPU (or a micro computer such as a micro processing unit (MPU) or a micro controller unit (MCU)). All or a part of the various processing functions may also be executed by a program analyzed and executed by the CPU (or the micro computer such as an MPU or MCU) or by hardware based on a wired logic.

Figure 7:
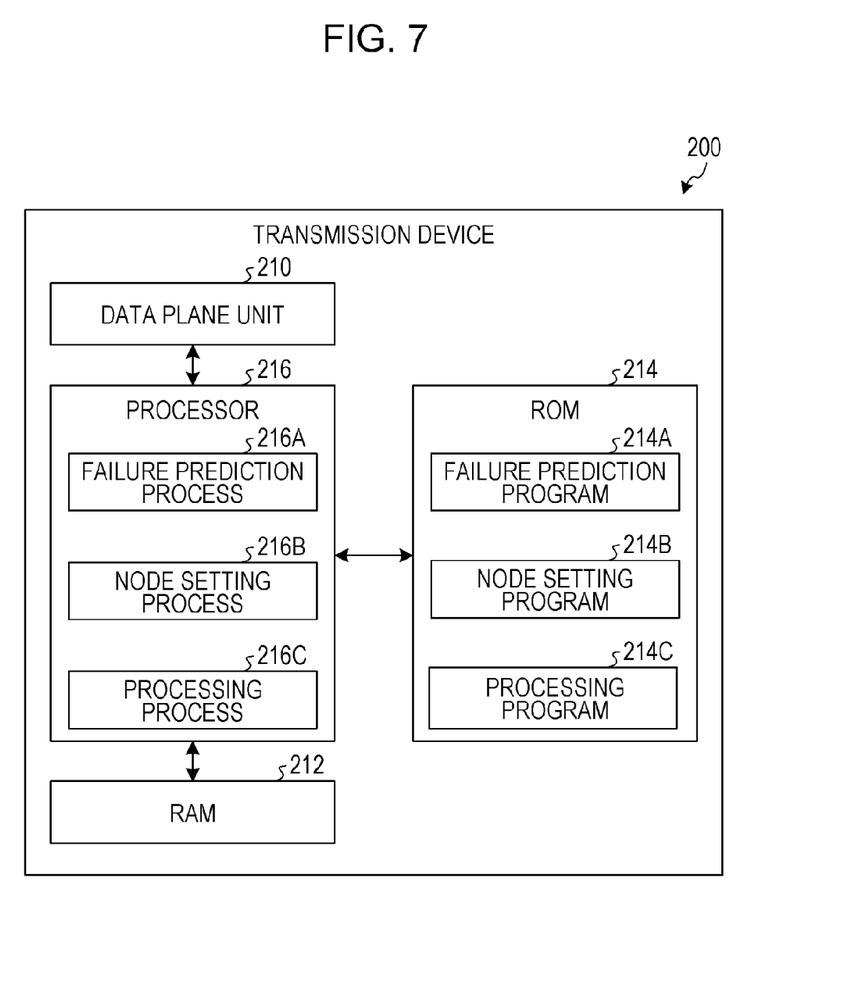
FIG. 7 is a diagram illustrating a configuration example of a transmission device that executes a transmission program, according to an embodiment.

The various types of the processes described according to the embodiment may be realized by executing a previously prepared program in a transmission device. In view of the above, an example of the transmission device that executes a program having a function similar to the above-mentioned embodiment will be described below. FIG. 7 is a diagram illustrating a configuration example of a transmission device that executes a transmission program, according to an embodiment.

A transmission device 200, illustrated in FIG. 7 and configured to execute a transmission program, includes a data plane unit 210, a RAM 212, a ROM 214, and a processor 216. The data plane unit 210 communicates with other transmission devices. The processor 216 controls the entirety of the transmission device 200.

The ROM 214 previously stores a transmission program that executes functions similar to the above-mentioned embodiment. The transmission program may be recorded on a recording medium that is readable by a drive that is not illustrated in the drawing instead of the ROM 214. The recording medium may be, for example, a portable recording medium such as a CD-ROM, a DVD disc, or a USB memory, a semiconductor memory such as a flash memory, or the like. The transmission program includes a failure prediction program 214A, a node setting program 214B, and a processing program 214C as illustrated in FIG. 7. The programs 214A to 214C may be appropriately integrated or disintegrated. The RAM 212 stores transmission quality data, path information related to node setting, and the transmission quality data of the corresponding working path.

The processor 216 reads out these programs 214A to 214C from the ROM 214 and executes the respective read programs. As illustrated in FIG. 7, the processor 216 then causes the respective programs 214A to 214C to function as a failure prediction process 216A, a node setting process 216B, and a processing process 216C, respectively.

The processor 216 predicts a working path having the highest probability that a failure is likely to occur among the working paths, on the basis of the transmission quality data on the respective working paths corresponding to the plural protection paths. The processor 216 previously sets, on the data plane unit 210, setting values for a protection path corresponding to the predicted working path. Furthermore, the setting values set on the data plane unit 210 are validated on the basis of a request for activation processing for activating the corresponding protection path, and for switching from the predicted working path to the corresponding protection path. As a result, in a case where a failure occurs on the working path as predicted, it is possible to shorten a period of time from the occurrence of failure on the working path to the completion of the switching to the protection path.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus for switching a communication path, the apparatus serving as a node in a communication network on which a plurality of working paths and a plurality of protection paths for bypassing the plurality of working paths are set, the plurality of protection paths sharing bandwidths allocated to the plurality of protection paths, the apparatus comprising:

a data plane unit configured to function as an interface that transmits and receives data with another apparatus serving as a node in the communication network;

a failure prediction unit configured to predict a first working path having a highest probability that a failure is likely to occur, among the plurality of working paths, based on transmission qualities of the plurality of working paths corresponding to the plurality of protection paths;

a node setting unit configured to beforehand set, to the data plane unit, a setting value for a first protection path corresponding to the first working path; and a processing unit configured to validate the setting value set to the data plane unit, based on a request of activation processing for activating the first protection path corresponding to the first working path, when the first working path is switched to the first protection path.

2. The apparatus of claim 1, wherein
the data plane unit obtains a transmission quality by measuring at least one of a bit error rate, a bit correction rate based on an error correction code, a packet discard rate, and an optical signal to noise ratio, and outputs data on the obtained transmission quality.

3. The apparatus of claim 1, further comprising:
a signaling unit configured to notify each of nodes located along the first protection path, of the transmission quality for the first working path.

4. The apparatus of claim 3, wherein
the apparatus serving as a first node that is located at a start point of the first protection path and connected to the first working path notifies another apparatus serving as a second node along the first protection path, by using a signaling message for the first protection path, of the transmission quality that has been notified by using a signaling message for the first working path.

5. A method for switching a communication path, the method being performed by an apparatus serving as a node in a communication network on which a plurality of working paths and a plurality of protection paths that bypass the plurality of working paths are set, the plurality of protection paths sharing bandwidths allocated to the plurality of protection paths, the method comprising:

predicting a first working path having a highest probability that a failure is likely to occur, among the plurality of working paths, based on transmission qualities of the plurality of working paths corresponding to the plurality of protection paths;

beforehand setting, to a data plane unit functioning as an interface that transmits and receives data with another apparatus serving as a node in the communication network, a setting value for a first protection path corresponding to the first working path; and validating the setting value set to the data plane unit, based on a request of activation processing for activating the first protection path corresponding to the first working path, when the first working path is switched to the first protection path.

6. A non-transitory computer readable recording medium having stored therein a program for causing a computer to execute a procedure, the computer being included in an apparatus serving as a node in a communication network on which a plurality of working paths and a plurality of protection paths for bypassing the plurality of working paths are set, the plurality of protection paths sharing bandwidths allocated to the plurality of protection paths, the apparatus including a data plane unit configured to set an interface that transmits and receives data with another apparatus serving as a node in the communication network, the procedure comprising:

predicting a first working path having a highest probability that a failure is likely to occur, among the plurality of working paths, based on transmission quality data of the plurality of working paths corresponding to the plurality of protection paths;

beforehand setting, to a data plane unit functioning as an interface that transmits and receives data with another apparatus serving as a node in the communication network, a setting value for a first protection path corresponding to the first working path; and validating the setting value set to the data plane unit, based on a request of activation processing for activating the first protection path corresponding to the first working path, when the first working path is switched to the first protection path.

* * * * *